United States Patent
Huber

(10) Patent No.: US 12,287,042 B2
(45) Date of Patent: Apr. 29, 2025

(54) ACTUATOR HAVING AN ELECTRIC MOTOR AND AN ELECTROMAGNET ARRANGED MOVABLY ON THE ROTOR OF THE ELECTRIC MOTOR TO APPLY A HOLDING TORQUE WITH CONTACT VIA A REMANENT MAGNETIC FIELD

(71) Applicant: Siemens Schweiz AG, Zürich (CH)

(72) Inventor: Wolfgang Huber, Hünenberg See (CH)

(73) Assignee: SIEMENS SCHWEIZ AG, Zurich (CH)

( * ) Notice: Subject to any disclaimer, the term of this patent is extended or adjusted under 35 U.S.C. 154(b) by 3 days.

(21) Appl. No.: 18/043,687

(22) PCT Filed: Jul. 22, 2021

(86) PCT No.: PCT/EP2021/070574
§ 371 (c)(1),
(2) Date: Mar. 1, 2023

(87) PCT Pub. No.: WO2022/053215
PCT Pub. Date: Mar. 17, 2022

(65) Prior Publication Data
US 2023/0313901 A1    Oct. 5, 2023

(30) Foreign Application Priority Data
Sep. 10, 2020  (DE) ............... 10 2020 211 409.9

(51) Int. Cl.
*F16K 31/04*  (2006.01)
*H02K 7/102*  (2006.01)
*H02K 7/116*  (2006.01)

(52) U.S. Cl.
CPC ......... *F16K 31/046* (2013.01); *H02K 7/1023* (2013.01); *H02K 7/116* (2013.01)

(58) Field of Classification Search
CPC .................................................. F16K 31/046
See application file for complete search history.

(56) References Cited

U.S. PATENT DOCUMENTS

| | | | | |
|---|---|---|---|---|
| 2,214,807 | A | * | 9/1940 | Buckley ............... H02K 7/1023 477/23 |
| 2,396,950 | A | * | 3/1946 | Hemphill ............. H02K 7/1023 188/171 |

(Continued)

FOREIGN PATENT DOCUMENTS

| | | | |
|---|---|---|---|
| DE | 12 90 244 | 3/1969 | ........... H02K 7/1023 |
| DE | 15 38 927 | 4/1970 | ........... H02K 7/1023 |

(Continued)

OTHER PUBLICATIONS

Search Report for International Application No. PCT/EP2021/070574, 13 pages, Nov. 16, 2021.

*Primary Examiner* — Umashankar Venkatesan
(74) *Attorney, Agent, or Firm* — Slayden Grubert Beard PLLC

(57) ABSTRACT

Various embodiments of the teachings herein include an actuator for a flap or for a valve for adjusting a gaseous or fluid volume flow. The actuator may include: a housing; an electric motor disposed in the housing; a downstream reduction gear; and a positioning element with an actuator connection for the flap or the valve. There is an electromagnet adjacent to an outer side of the rotor with a coil arrangement with a magnetic core. There is an electrical circuit arrangement for activating the electromagnet, providing a first brief current pulse, so a remanent magnetic field remains in the coil core. In a holding position of the actuator, while a mechanical pre-tensioning is set up, there is a holding torque with contact to the outer side of the rotor. The circuit arrangement provides a second brief current pulse to extinguish the remanent magnetic field still present in the coil (Continued)

core for releasing the holding torque with contact, forming an air gap between the electromagnet and the outer side of the rotor.

21 Claims, 2 Drawing Sheets

(56) References Cited

U.S. PATENT DOCUMENTS

| | | | | |
|---|---|---|---|---|
| 2,823,325 A | * | 2/1958 | Stephan | F16D 59/02 |
| | | | | 188/77 R |
| 2,911,843 A | * | 11/1959 | Mitchell | F16K 31/046 |
| | | | | 74/388 R |
| 3,423,661 A | | 1/1969 | Gustafson | 318/475 |
| 4,798,269 A | * | 1/1989 | Lindner | F16D 55/28 |
| | | | | 188/71.7 |
| 4,951,518 A | * | 8/1990 | Hendershot | H02K 7/116 |
| | | | | 74/395 |
| 5,758,684 A | * | 6/1998 | Hudson | F16K 31/046 |
| | | | | 137/269 |
| 6,471,017 B1 | | 10/2002 | Booz | 188/72.7 |
| 10,454,341 B1 | | 10/2019 | Grundmann | H02K 7/106 |
| 2002/0170786 A1 | | 11/2002 | Bucher | 188/185 |
| 2020/0224742 A1 | | 7/2020 | Uffelman | F16D 67/06 |

FOREIGN PATENT DOCUMENTS

| | | | |
|---|---|---|---|
| DE | 197 52 543 | 6/1999 | F16D 65/21 |
| DE | 198 32 694 | 1/2000 | H02P 3/04 |
| DE | 10 2018 210167 | 12/2019 | H02K 7/10 |
| EP | 1 258 969 | 11/2002 | H02K 7/102 |
| EP | 1 642 858 | 4/2006 | H02K 21/22 |
| EP | 1 655 259 | 5/2006 | B66B 11/08 |
| JP | 2019 196815 | 11/2019 | F16K 31/04 |
| KR | 100817664 B1 | 3/2008 | B66B 11/04 |
| WO | 2007 089693 | 8/2007 | B60L 7/00 |

* cited by examiner

ACTUATOR HAVING AN ELECTRIC MOTOR AND AN ELECTROMAGNET ARRANGED MOVABLY ON THE ROTOR OF THE ELECTRIC MOTOR TO APPLY A HOLDING TORQUE WITH CONTACT VIA A REMANENT MAGNETIC FIELD

CROSS-REFERENCE TO RELATED APPLICATIONS

This application is a U.S. National Stage Application of International Application No. PCT/EP2021/070574 filed Jul. 22, 2021, which designates the United States of America, and claims priority to DE Application No. 10 2020 211 409.9 filed Sep. 10, 2020, the contents of which are hereby incorporated by reference in their entirety.

TECHNICAL FIELD

The present disclosure relates to actuators. Various embodiments may include actuators for a flap or for a valve for adjusting a gaseous or fluid volume flow, in particular for HVAC applications for heating, ventilation or air conditioning.

BACKGROUND

Some actuators have a housing and an electric motor accommodated therein, a downstream gear, in particular a reduction gear, and as a take-off, a positioning element with an actuator connection for the flap or for the valve. The electric motor comprises a stator and a rotor circumferential to an axis of rotation of the electric motor and lying coaxially outside it. The rotor is in particular embodied magnetically. "Magnetic" here means that, in testing, a permanent magnet would stick to the rotor of the electromagnet.

With such actuators the flap or the valve is moved by the positioning element of the actuator around an adjustment axis or is formed directly at least in part by said axis. The actuator is often configured to move the positioning element from a first adjustment position into a second adjustment position. Both adjustment positions can usually form end stops. What is more a first adjustment position can be referred to as a start position or idle position, into which the actuator returns the positioning element again in the no-load state of the positioning element, i.e. of the electric motor, in particular by means of a pretensioned return spring. These types of actuators are also referred to as fail-safe actuators. The second adjustment position can be referred to as the actuation position or end position. The actuator connection can be arranged rotatably about its adjustment axis within a predetermined range of angles of rotation between an idle position (start position) and an actuation setting (end position). The maximum angular range of adjustment between these two rotation settings preferably lies at 90°±10°.

In the case of non-fail-safe actuators electric motors with an increased detent torque are often required, so that the actuator does not "run on" beyond the available torque of the load, i.e. of the flap or of the valve. To this end, the electric motors intended for this purpose typically have a rotor with a latching torque wheel. As an alternative, the actuators considered can also be linear actuators, which bring about a linear adjustment movement of the positioning element along an adjustment axis at the actuator connection, in order for example to control the opening, part opening or closing of a valve. Such actuators can be designed both as fail-safe and non-fail-safe drives.

In order to hold a fail-safe actuator in the actuation position the simplest method is to hold the electric motor in the actuation position via a permanently present holding current (minimum current). Only if the power supply and thus the holding current drops away or fails does the spring contract, and the actuator moves the positioning element into the safe idle position.

In a further known solution, a lifting magnet engages into the reduction gear of the actuator in order to prevent an automatic movement of the positioning element into the safe idle position. If the power supply is lost or fails, the lifting magnet releases itself from the gear. The gear now runs free so that the actuator can move the positioning element back into the safe idle position.

Both of the aforementioned solutions have a really high power consumption in the actuation position. Thus the switch-on time for safety-relevant fire protection flaps actually amounts to 100% (ED 100%).

SUMMARY

The teachings of the present invention address, at least in part, the disadvantages of actuators described above. Various embodiments of these teachings include an actuator that can be employed flexibly and/or a fail-safe actuator that needs a lower electrical power (power consumption). For example, some embodiments include an actuator for a flap or for a valve for adjusting a gaseous or fluid volume flow, wherein the actuator has a housing, an electric motor (MO) accommodated therein, a downstream reduction gear (G) and, as a take-off, a positioning element with an actuator connection for the flap or the valve, wherein the electric motor (MO) has a stator (ST) and a rotor (RO) circumferential to an axis of rotation (A) of the electric motor (MO) and lying coaxially outside it, characterized in that, the actuator has an electromagnet (E1-E3) arranged adjacent to an outer side (RA, AA) of the rotor (RO), wherein this (E1-E3) comprises a coil arrangement (L) with a magnetic coil core (K), the actuator has an electrical circuit arrangement for activation of the electromagnet (E1-E3), by means of the circuit arrangement a first brief current pulse is able to be injected into the coil arrangement (L), so that subsequently a remanent magnetic field remains in the coil core (K), in order, in a holding position of the actuator, while a mechanical pre-tensioning is set up, to apply a holding torque with contact ($M_{FH}$) to the outer side (RA, AA) of the rotor (RO), and by means of the circuit arrangement a second brief current pulse is able to be injected into the coil arrangement (L), in order subsequently essentially to extinguish the remanent magnetic field still present in the coil core (K) for releasing the holding torque ($M_{FH}$) with contact, while an air gap (LS) between the electromagnet (E1-E3) and the outer side (RA, AA) of the rotor (RO) is formed.

In some embodiments, the electromagnet (E1, E2) is arranged movably adjacent to the outer side (RA, AA) of the rotor (RO) in such a way that the electromagnet (E1, E2), while the mechanical pretensioning in the holding position for applying the holding torque ($M_{FH}$) is formed, rests against the outer side of the rotor, the first brief current pulse is able to be injected into the coil arrangement (L) in such a way that the electromagnet (E1, E2) closes the air gap (LS) by means of magnetic force (F) towards the holding position and, through the remanent magnetic field remaining in the coil core (K), while the holding torque ($M_{FH}$) to the outer side (RA, AA) of the rotor (RO) is formed, remains magnetically adhesive, and the second brief current pulse is able to be injected into the coil arrangement (L) in such a way that that a remanent magnetic field still present in the coil core (K) is essentially extinguished, wherein the electromagnet (E1, E2) moves away automatically, while the air gap (LS) is formed, from the outer side of the rotor towards the free running position and remains there.

In some embodiments, the electric motor (MO) is arranged on a base plate (GP) in the housing of the actuator, wherein the electromagnet (E1) is arranged movably on the base plate (GP) in the housing and has a magnetic working end (W), wherein the electromagnet (E1) is aligned in such a way on the base plate (GP) that the working end (W) of the electromagnet (E1), in the free running position, lies against a radial outer side (RA) of the rotor (RO) while the air gap (LS) is formed.

In some embodiments, the electromagnet (E1) is arranged by means of an elastic holding element (BS) for setting up the mechanical pretensioning on the bracket (HA) of the housing or on the base plate (GP) in the housing.

In some embodiments, the electromagnet (E3) is arranged fixed in relation to the housing, a rotatably supported two-sided lever element (HE) is arranged between a magnetic working end (W) of the electromagnet (E3) and the outer side (RA, AA) of the rotor (RO) in such a way that a first and opposite second end of the lever element (HE) respectively form an air gap (LS) to the outer side (RA, AA) of the rotor (RO) and to the working end (E) in a free running position, and that the first and opposite second end of the lever element (HE) rest with contact against the outer side (RA, AA) of the rotor (RO) and the working end (W) in a holding position, the first brief current pulse is able to be injected in such a way into the coil arrangement (L) that the electromagnet (E3) closes both air gaps (LS) by means of magnetic force (F) towards the holding position, wherein the second end of the lever element (HE) remains stuck through the remanent magnetic field remaining in the coil core (K) to the working end (W) of the electromagnet (E3) and wherein the first end of the lever element (HE) rests, while the holding torque ($M_{FH}$) is applied, against the outer side (RA, AA) of the rotor (RO), and the second brief current pulse is able to be injected into the coil arrangement (L) in such a way that the remanent magnetic field present in the coil core (K) of the electromagnet (E3) is essentially extinguished, and wherein the first and second end of the lever element (HE), while the respective air gap (LS) is formed, move away from the outer side (RA, AA) of the rotor (RO) and away from the working end (W) of the electromagnet (E3) into the free running position.

In some embodiments, the electric motor (MO) and the electromagnet (E3) are arranged fixed to a base plate (GP) in the housing of the actuator, and wherein the lever element (HE) is arranged for rotation around an axis of rotation of the lever (D) running in parallel to the axis of rotation (A) of the electric motor (MO), so that the first end of the lever element (HE), opposite to the working end (W) of the electromagnet (E3) is able to be laid tangentially on the radial outer side (RA) of the rotor (RO) in the holding position.

In some embodiments, a spring element (ZF) fixed in relation to the housing engages in such a way on the lever element (HE) that the lever element (HE), in the event of the remanent magnetic field present in the coil core (K) of the electromagnet (E3) essentially being extinguished, is moved automatically into the free running position and is held there.

In some embodiments, the actuator, instead of a two-sided lever element (HE), has a single-sided swivel lever element, wherein a first end of the end of the swivel lever element is supported at a pivot point fixed in the housing, wherein an opposite second end of the swivel lever element, in the free running position while an air gap is formed, lies opposite the working end (W) of the electromagnet (E3) or, in the holding position while the air gap is closed, rests directly against the working end (W), and wherein, in the free running position, a middle part embodied between the first and second end of the swivel lever element, while an air gap is formed, lies opposite the outer side (RA, AA) of the rotor (RO) of the electric motor (MO) or in the holding position, while closing the air gap, rests directly against the outer side (RA, AA) of the rotor (RO).

In some embodiments, the coil core (K) is a soft magnetic coil core (K), wherein a permanent magnet (PM), which creates a permanent magnetic field in the coil core (K), is arranged in the coil core (K), wherein the permanent magnetic field, on injection of the second brief current pulse into the coil arrangement (L) and after re-establishment of the air gap (LS) to a working end (W) of the electromagnet (E1-E3), is essentially no longer effective and is thus extinguished.

In some embodiments, a part (E1, E2, HE) adhering to the outer side (RA, AA) of the rotor (RO) in the holding position comprises a brake coating (B), wherein the brake coating (B) has a coefficient of friction ($\mu_H$) for the pairing of brake coating and outer side of the rotor of at least 0.5, in particular of at least 0.8.

In some embodiments, the rotor (RO), on its outer side (RA, AA), has toothing (VZ) running around it tangentially with regard to an axis of rotation (A) of the electric motor (MO) with alternating teeth (ZA) and tooth gaps (ZL), wherein the tooth gaps (ZL) have a tangential tooth gap dimension and wherein a part (E1, E2, HE, B) adhering to the outer side (RA, AA) of the rotor (RO) in the holding position, has a maximum tangential dimension (T), so that this latches in the holding position with one of the tooth gaps (ZL) of the toothing (VZ).

In some embodiments, the actuator has a control unit for receiving a control signal and for corresponding activation of the electric motor (MO) for moving the positioning element from a predetermined first actuation position to a predetermined second actuation position, the control unit is configured to activate the electrical circuit arrangement for activating the electromagnet (E1-E3) in such a way that the electromagnet (E1-E3), before or with the activation of the electric motor (MO) for moving the positioning element from the first actuation position to the second actuation position, switches from the holding position into the free running position, and the control unit is configured to activate the electrical circuit arrangement in such a way that the electromagnet (E1-E3), as or after it reaches the second actuation position of the positioning element, switches from the free running position into the holding position.

In some embodiments, the actuator has a control unit for activation of the electric motor (MO) when the power supply of the actuator is switched on or when a switch-on signal to drive the positioning element from a safe idle position to an actuation position is received, the actuator has a return spring (RF) for providing a return torque acting on the positioning element for automatically moving the positioning element into the safe idle position, in particular when the power supply for the actuator is lost, wherein the return element brings about a rotor return torque ($M_{FR}$) at the electric motor (MO) via the reduction gear (G), the holding torque ($M_{FH}$) applied by means of the electromagnet (E1-E3) to the rotor (RO) in the holding position is greater that the rotor return torque ($M_{FR}$) acting on the rotor (RO), in particular at least 1.5 times to 3 times as great, and the control unit is configured to activate the electrical circuit arrangement on receipt of a switch-off signal in such a way that the electromagnet (E1-E3) switches from the holding position into the free running position, so that the positioning element is moved back automatically into the safe idle position, or the electrical circuit arrangement is configured in such a way that, when the power supply is lost, the electromagnet (E1-E3) switches from the holding position into free running position, so that the positioning element is moved back automatically into the safe idle position.

In some embodiments, the actuator has a control unit for activation of the electric motor (MO) when the power supply of the actuator is switched on or when a switch-on signal for moving the positioning element from a safe idle position to an actuation position is received, the actuator has a return spring (RF) for providing a return torque acting on the positioning element for automatically moving the positioning element into the safe idle position, in particular when the power supply for the actuator is lost, the flap connected to the actuator connection, or the valve connected to the actuator connection as well as the return spring (RF) exert an overall torque on the positioning element, wherein the overall torque brings about an overall rotor torque at the rotor (RO) via the reduction gear (G), the holding torque ($M_{FH}$) applied by means of the electromagnet (E1-E3) to the rotor (RO) of the electric motor (MO) in the holding position is greater than the overall rotor torque acting on the rotor (RO), in particular at least 1.5 times to 3 times as great, and the control unit is configured to activate the electrical circuit arrangement on receipt of a switch-off signal in such a way that the electromagnet (E1-E3) switches from the holding position into the free running position, so that the positioning element is moved back automatically into the safe idle position, or the electrical circuit arrangement is configured in such a way that the electromagnet (E1-E3) switches from the holding position into the free running position when the power supply is lost, so that the positioning element is moved back automatically into the safe idle position.

In some embodiments, the coil arrangement of the electrical circuit arrangement has an electrical coil (L), wherein the electrical coil (L) is connected in series with a capacitor (C), wherein the series circuit is connected by a first end to a common reverence potential, wherein a second end is able to be switched via a switching means (WS) of the electrical circuit arrangement to a supply voltage or to the common reference potential, wherein the inductance value of the electrical coil (L) and the capacitance value of the capacitor (C) are dimensioned in such a way that, when the second end of the series circuit is switched to the supply voltage, the first brief current pulse is able to be injected into the electrical coil (L) and, when the second end of the series circuit is switched to the common reference potential, the second brief current pulse is able to be injected into the electrical coil (L) with the reversed current direction.

BRIEF DESCRIPTION OF THE DRAWINGS

Further advantages, features, and details of the teachings herein emerge from the description given below, in which exemplary embodiments are described in detail while referring to the drawings. In this case the features mentioned in the claims and the features mentioned in the description can be of importance individually or in any given combination in each case. Elements with the same function and mode of operation are each provided with the same reference characters in FIGS. 1 to 6. In the figures, in schematic diagrams:

DETAILED DESCRIPTION

Figure 1:
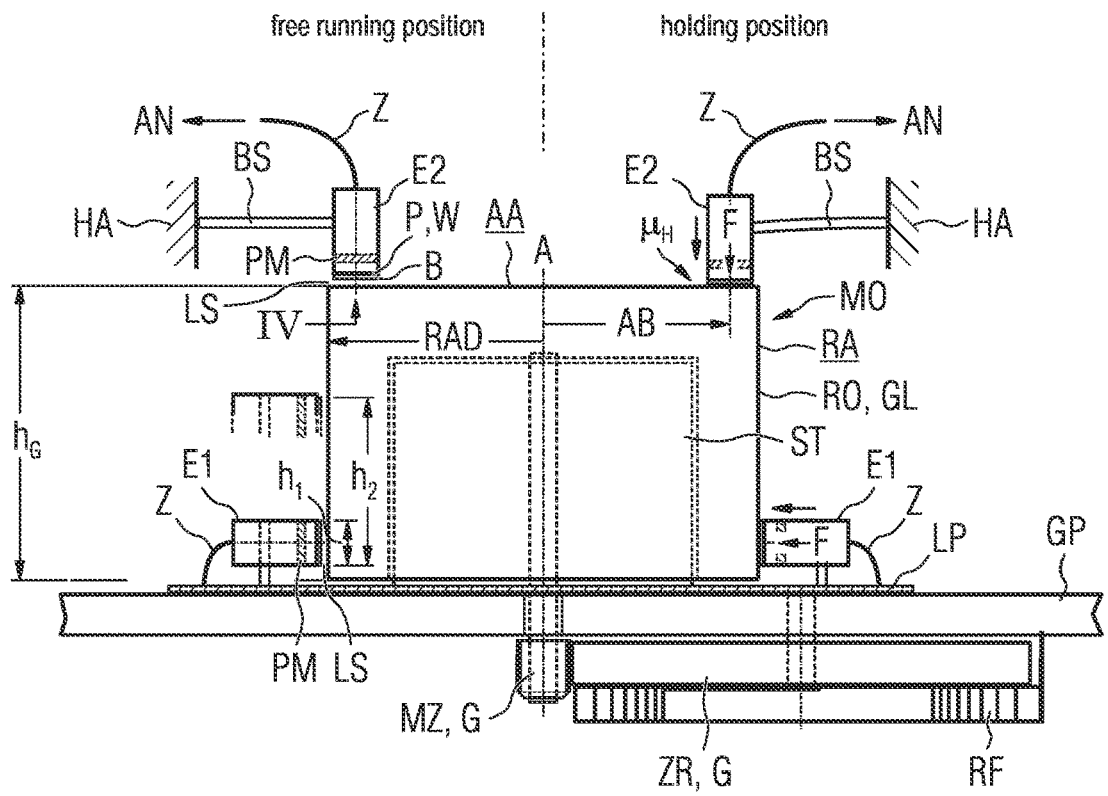
FIG. 1 shows a cross-sectional diagram through an example of an actuator with a first and second electromagnet for applying a holding torque with contact via a remanent magnetic field incorporating teachings of the present disclosure to an axial and alternatively radial outer side of the rotor respectively and in a free running and holding position respectively.

In various embodiments of the teachings of the present disclosure, the actuator has an electromagnet arranged adjacent to an outer side of the rotor. The electric motor is thus not a component of the rotor itself. The electromagnet comprises a coil arrangement with a magnetic coil core. The actuator has an electrical circuit arrangement for activating the electromagnet. By means of the circuit arrangement a first current pulse is able to be injected into the coil arrangement, so that subsequently a remanent magnetic field remains in the coil core, in order, in a holding position, to apply a mechanical pre-tensioning to a holding torque with contact to the outer side of the rotor of the electric motor. By means of the circuit arrangement a second, maybe brief current pulse is able to be injected into the coil arrangement, in order subsequently essentially to extinguish the remanent magnetic field for releasing the holding torque with contact that is still present in the coil core, by embodying an air gap between the electromagnet and the outer side of the rotor of the electric motor.

The coil arrangement can have a (single) coil or winding wound around the magnetic coil core, wherein the coil or winding can then be powered by means of an exciter current with a positive and negative sign. In some embodiments, the coil arrangement can also have two coils or windings wound around the magnetic coil core, which can be powered separately with an exciter current. The magnetic coil core or magnetic core can be a soft magnetic or hard magnetic coil core.

"Soft magnetic" means that the soft magnetic materials coming into consideration for the coil core, such as iron, cobalt, nickel alloys or ferrites, are able to be magnetized easily in a magnetic field. This magnetic polarization can be created for example by an electric current in a coil through which the current is flowing or by the presence of a permanent magnet. The polarization leads in all soft magnetic materials to a multiply higher flux density than the magnetic field acting from outside creates. The soft magnetic materials for the coil core in particular possess a coercivity field strength of less than 1000 A/m.

"Hard magnetic" means that the hard magnetic materials coming into consideration for the coil core possess very high coercivity field strengths $H_C$ and accordingly present a high resistance to external magnetic fields. A remagnetization (or demagnetization) is only achieved via the action of very strong external magnetic fields. For operation in one of the actuators described herein, the electromagnets considered may be extremely resistive and robust. Hard magnetic materials are for examples alloys made from AlNiCo (for aluminum, nickel and cobalt), made from CuNiFe (for copper, Nickel and iron), made from CuNiCo (for copper, nickel and cobalt), made from FeCoCr (for iron, cobalt and chrome), made from MnAlC (for manganese, aluminum and carbon) or PtCo (for platinum and cobalt). The hard magnetic materials can be hard ferrites or also martensitic steels. The hard magnetic materials for the coil core possess a coercivity field strength of at least 1000 A/m, in particular of at least 5000 A/m.

"Essentially extinguished" or compensated for means that the remaining magnetic field (remanent magnetic field) forming at the electromagnet has a (maximum) flux density value that is less than 20%, in particular less than 10%, or less than 5%, compared to the (maximum) flux density value of the remanent magnetic fields. Magnetic remanence or residual magnetism is to be understood here as that magnetization that a magnetized particle previously saturated by an external magnetic field, for example by means of a coil with current flowing through it or a permanent magnet, retains after removal of the external field.

"Brief" first or second current pulse means a pulse length in the region of 5 ms to 1000 ms, in particular in the region of 5 ms to 200 ms and/or in the region of 10 ms to 50 ms. Due to the relatively long time intervals between a switch from the hold position into the free running position and vice versa, the pulse length of the first or second current pulse can also lie in the region of seconds or minutes. However such a long pulse length would lead to an unnecessary thermal load on the coil arrangement in an electromagnet.

The mechanical pre-tensioning can be brought about for example by means of a spring element, a flexural spring or a rubber buffer. In this case the resetting force back to the free running position brought about by the mechanical pretensioning is significantly less than the holding force exerted by the remanent magnetic field on the outer side of the rotor.

By means of the "switchable" remanent magnetic field remaining at the electromagnet it is possible for electrical energy only to be needed for the process of switching over from the free running position into the holding position and vice versa. For very much of the time between the switchover processes only a vanishingly small portion of electric power is needed.

Thus, for the fail-safe operation of a known actuator for example, a continuous electrical power of 2 watts is needed in order to hold the electric motor in the actuation position against the return torque of the return spring. Over the whole year an electrical energy requirement of around 17 kWh is produced. By contrast, with the inventive actuator, on account of the only occasional test trippings and also on account of the even rarer actual trippings in the danger situation, an annual electrical energy requirement of less than 1 kWh is necessary.

On account of the typically very high gear reduction in the region of 1:1000 to 1:10000 and on account of the lever for the application of the electromagnet lying very far outside the rotor, only a comparatively small holding force of less than 1 N, in particular of less than 0.1 N, is required in order to hold the positioning element of the actuator in position.

In some embodiments, the electromagnet is arranged movably adjacent to the outer side of the rotor in such a way that the electromagnet, when the mechanical pretensioning is established, rests against the outer side of the rotor in the holding position for applying the holding torque.

"Movably" generally means movements of the electromagnet sometimes with only one (single) degree of freedom, i.e. back and forth in the axial direction to the axial outer side of the rotor or back and forth in the radial direction to the radial outer side of the rotor. The air gap can, when embodied in such a manner, assume values ranging from 1 mm to 5 mm, and/or ranging from 1.5 mm to 3 mm.

The first brief current pulse is able to be injected into the coil arrangement in such a way that the electromagnet closes the air gap up to the holding position by means of magnetic force and, through the remanent magnetic field remaining in the coil core while the holding torque is applied, remains sticking to the outer side of the rotor.

The second brief current pulse is able to be injected into the coil arrangement in such a way that the remanent magnetic field still present in the coil core is essentially extinguished, wherein the electromagnet moves away automatically, while the air gap is formed, from the outer side of the rotor to the free running position and remains there.

In some embodiments, the electric motor is arranged (fixed) on a base plate in the housing of the actuator. The electromagnet is arranged movably on the base plate in the housing and has a magnetic working end. The electromagnet is aligned on the base plate in such a way that the working end of the electromagnet, in the free running position, lies opposite a radial outer side of the rotor while the air gap is formed.

In some embodiments, the electric motor is arranged on a base plate in the housing of the actuator. The electromagnet is arranged movably on a bracket of the housing and has a magnetic working end. The electromagnet is aligned on the bracket in such a way that the working end of the electromagnet, in the free running position, lies opposite a radial outer area on the axial outer side of the rotor while the air gap is formed.

In both of the previous embodiments the respective electromagnet, at its magnetic working end, can embody two pole shoes, which are adapted in their shape for guiding the magnetic field into the outer side of the rotor opposite them.

In some embodiments, the electromagnet is arranged by means of a flexible elastic holding element on the bracket of the housing or on the base plate in the housing. In the simplest case the flexible elastic holder element is a punched part made of spring steel.

In some embodiments, the electromagnet is arranged fixed in a housing. A rotatably supported two-sided lever element is arranged between a magnetic working end of the electromagnet and the outer side of the rotor in such a way that a first end of the lever element and a second end opposite to it each form an air gap to the outer side of the rotor and to the working end in a free running position. The first and opposite second end of the lever element then rest with contact against the outer side of the rotor and at the working end in a holding position.

The first brief current pulse is able to be injected into the coil arrangement in such a way that the electromagnet closes both air gaps by means of magnetic force through to their holding position. In this case the second end of the lever element, through the remanent magnetic field remaining in the coil core, remains sticking to the working end of the electromagnet. The first end of the lever element rests against the outer side of the rotor while the holding torque is applied.

The second brief current pulse is able to be injected into the coil arrangement in such a way that the remanent magnetic field present in the coil core of the electromagnet is essentially extinguished or compensated for. In this case the first and second end of the lever element, while the respective air gap is formed, move away from the outer side of the rotor and away from the working end of the electromagnet into the free running position.

A rotatably supported two-sided lever element is arranged between a magnetic working end of the electromagnet and the outer side of the rotor in such a way that a first and opposite second end of the lever element each form an air gap to the outer side of the rotor and to the working end in a free running position. The lever element can be made of a non-magnetic material, such as a plastic for example.

By contrast, in a holding position, the first and the opposite second end of the lever element rest with contact against the outer side of the rotor and the working end of the electromagnet. Further in accordance with invention the actuator has an electrical circuit arrangement for activating the electromagnet.

A first brief current pulse is further able to be injected into the coil arrangement by means of the circuit arrangement, so that the electromagnet closes the two air gaps by means of magnetic force through to the holding position. The second end of the lever element, through a remanent magnetic field remaining in the coil core, remains sticking to the working end of the electromagnet. The first end of the lever element rests, while a holding torque is applied, against the outer side of the rotor.

In some embodiments, a second brief current pulse with the opposite current direction is able to be injected into the coil arrangement by means of the circuit arrangement, so that the remanent magnetic field present in the coil core of the electromagnet is essentially extinguished or compensated for, wherein the first and second end of the lever element, while the respective air gap is formed, move away from the outer side of the rotor and away from the working end of the electromagnet into the free running position.

By means of the "switchable" remanent magnetic field remaining at the electromagnet, through which the first end of the lever element remains sticking to the magnetic working end, it is once again possible that electrical energy is needed only for the switchover process from the free running position into the holding position and vice versa. This inventive actuator, in the actuation position that it occupies for the vast majority of the time, requires less electrical power.

In some embodiments, the electric motor and the electromagnet are arranged fixed relative to a base plate in the housing of the actuator. The lever element is arranged rotatably around an axis of rotation of the lever running in parallel to the axis of rotation of the electric motor, so that the first end of the lever element, opposite to the working end of the electromagnet, is able to be placed tangentially on the radial outer side of the rotor in the holding position.

In some embodiments, a spring element fixed relative to the housing engages with the lever element in such a way that the lever element, for the case in which the remanent magnetic field present in the coil core of the electromagnet is essentially extinguished or compensated for, is moved into the free running position and is held there. The lever element is thereby automatically moved into the free running position especially safely.

In some embodiments, the actuator, instead of a two-sided lever element, has a one-sided swivel lever element. A first end of the swivel lever element is supported in a fixed pivot point or rotary support relative to the housing. An opposite second end of the end of the swivel lever element, in the free running position, while an air gap is formed, lies opposite the working end of the electromagnet. Or the opposite second end of the swivel lever element, in the holding position, while the air gap is closed, rests directly against the working end. In the free running position a middle part embodied between the first and second end of the swivel lever element, while the air gap is formed, lies opposite the outer side of the rotor of the electric motor or the middle part rests in the holding position while the air gap is closed, directly against the outer side of the rotor.

In some embodiments, the coil core is made of a grain oriented electrical steel.

In some embodiments, the coil core is a soft magnetic coil core. Arranged in the coil core is a permanent magnet, which sets up a permanent magnetic field in the coil core and which, on injection of the second brief current pulse into the coil arrangement and after reestablishing the air gap at a working end of the electromagnet, is essentially no longer effective and is thus extinguished.

In this case, the magnetic circuit in the electromagnet is maintained in the holding position by the permanent magnetic field and after the removal of the magnetic field set up by the coil arrangement. After injection of the second current pulse into the coil arrangement there is an overlaying of the magnetic "control" flux of the coil arrangement with the magnetic permanent flux of the permanent magnetic integrated in the coil core. At this moment the magnetic working end of the electromagnet is essentially field-free. The electromagnet moves away from the "magnetic short circuit" by the magnetic outer side of the rotor or the first end of the lever element moves away from the magnetic working end of the electromagnet. As the air gap that now forms grows, the magnetic resistance at the working end of the electromagnet also increases until the permanent magnetic field inside the coil core initiates a magnetic flux with a smaller magnetic resistance. After loss of the magnetic field set up by the coil arrangement the magnetic flux of the permanent magnetic field remains enclosed inside the coil body. The magnetic working end of the electromagnet continues to remain essentially ineffective.

In some embodiments, the part sticking to the outer side of the rotor in the holding position comprises a brake coating, wherein the brake coating has a coefficient of friction for the pairing of brake coating and rotor outer side of at least 0.5, in particular of at least 0.8. This significantly increases the static friction and thus the static friction torque on the outer side of the rotor. The brake coating can be a thin layer of rubber, of plastic or the like with a maximum layer thickness in the range of 0.1 mm to 0.5 mm.

In some embodiments, the rotor, on its outer side, has toothing running tangentially with regard to an axis of rotation of the electric motor with alternating teeth and tooth gaps. The tooth gaps have a tangential tooth gap measurement. In this case, a part adhering to the outer side of the rotor in the holding position has such a maximum tangential dimension, which latches this in the holding position with one of the tooth gaps of the toothing.

The radial depth of a tooth gap lies in the range of 0.3 mm to 1.5 mm. This additionally increases the holding torque acting on the rotor by form fitting. The fact that the electric motor is first braked by the motor controller and the electromagnet "rests against" the stationary rotor, means that actually no friction braking is present. Moreover the braking effect via the toothing is much higher for the same magnetic force.

In some embodiments, the actuator has a control unit for receiving a control signal and for corresponding activation of the electric motor for moving the positioning element from a predetermined first actuation position to a predetermined second actuation position. The control unit is configured to activate the electrical circuit arrangement for activating the electromagnet in such a way that the electromagnet, before or with the activation of the electric motor for moving the positioning element from the first actuation position to the second actuation position, switches from the holding position into the free running position. Moreover the control unit is configured to activate the electrical circuit arrangement in such a way that the electromagnet, on or after reaching the second actuation position of the adjustment connection, switches from the free running position into the holding position. The control unit can be a higher-ranking microcontroller of the actuator for example.

This embodiment may be especially advantageous for non-fail-safe actuators. No latching torque wheel is necessary for the temporally matched switch from the holding position into the release position and back again for moving the positioning element.

In some embodiments, the actuator has a control unit for activation of the electric motor when the power supply of the actuator is switched on or when a switch-on signal for moving the positioning element from a safe idle position to an actuation position is received. The actuator has a return spring for providing a return element acting on the positioning element for automatically moving the positioning element into the safe idle position, in particular when the power supply for the actuator is lost. The return element brings about a rotor return torque at the electric motor via the reduction gear. The holding torque applied by means of the electromagnet to the rotor in the holding position in this case is greater than the return torque acting on the rotor. In particular the holding torque is at least 1.5 times to 3 times as great as the rotor return torque. This ensures that the actuator remains reliably in the actuation position.

To this end the control unit is configured to activate the electrical circuit arrangement when a switch-off signal is received in such a way that the electromagnet switches from the holding position into the free running position, so that the positioning element is moved back automatically into the safe idle position.

In some embodiments, the electrical circuit arrangement can be configured so that the electromagnet, when the power supply is removed, switches from the holding position into the free running position, so that the positioning element is moved back automatically into the safe idle position.

In some embodiments, the actuator has a control unit for activation of the electric motor when the power supply of the actuator is switched on or when a switch-on signal for moving the positioning element from a safe idle position to an actuation position is received. The actuator comprises a return spring for providing a return element acting on the positioning element for automatically moving the positioning element into the safe idle position, in particular when the power supply for the actuator is lost. The flap connected to the actuator connection, or the valve connected to the actuator connection, as well as the return spring, exert an overall torque on the positioning element. The overall torque further brings about via the reduction gear an overall rotor torque at the rotor. In this case the holding torque applied by means of the electromagnet to the rotor of the electric motor in the holding position is greater than the overall rotor torque acting on the rotor, in particular at least 1.5 times to 3 times as great. This ensures that the actuator, even when taking into account loads such as flaps or valves, remains reliably in the actuation position.

To this end, the control unit is once again configured to activate the electrical circuit arrangement when a switch-on signal is received in such a way that the electromagnet switches from the holding position into the free running position, so that the positioning element is moved back automatically into the safe idle position. In some embodiments, the electrical circuit arrangement can once again be configured so that the electromagnet, when the power supply is lost, switches from the holding position into the free running position, so that the positioning element is moved back automatically into the safe idle position.

In some embodiments, the electrical coil arrangement of the electrical circuit arrangement has an electrical coil, wherein the electrical coil is connected in series with a capacitor. The series circuit is connected with a first end to a common reference potential. A second end is able to be connected with a switching means of the electrical circuit arrangement (optionally) to a supply voltage or to the common reference potential. The switching means can for example be a toggle switch. The inductivity value of the electrical coil and the capacitance value of the capacitor are dimensioned in such a way that, when the second end of the series circuit is connected to the supply voltage, the first brief current pulse is able to be injected into the electrical coil and, when the second end of the series circuit is connected to the common reference potential, the second brief current pulse is able to be injected with the reversed current direction into the electrical coil.

In some embodiments, the switching means of the electrical circuit arrangement is able to be activated by the control unit of the actuator, so that the electromagnet switches from the holding position into the free running position and vice versa.

In some embodiments, the electromagnet has at its working end a pole shoe and a magnetic yoke (arranged) lying opposite it as a further pole shoe in such a way that the second end of the lever element lies between the pole shoe and the magnetic yoke. The second end of the lever element is moved away from the pole shoe towards then magnetic yoke when switching from the holding position to the free running position while an air gap is formed, and then remains there.

FIG. 1 shows a cross-sectional diagram through an example of an actuator with a first and second electromagnet E1, E2 for applying a holding torque with contact via a remanent magnetic field as described herein to an axial and alternatively radial outer side RA, AA of the rotor RO respectively and in a free running and holding position respectively.

The actuator shown is intended for a flap or for a valve for adjusting a gaseous or fluid volume flow. The actuator further has an electric motor MO arranged on a base plate GP fixed relative to the housing. The electric motor is accommodated in a housing of the actuator not shown any further. The latter comprises a stator with a plurality of armature coils embodied as multiple armatures arranged fixed relative to the base plate GP or arranged on a circuit carrier LP of the actuator. The armature coils of the stator ST are supplied with current under phase control via an electronic motor controller of the actuator. The circuit carrier LP for its part is arranged fixed relative to the base plate GP. Lying coaxially or radially external to the stator ST is a rotor RO arranged as a rotor bell GL or rotor cup. The rotor RO typically has plurality of permanent magnets, which alternate with regard to the axis of rotation A in the tangential direction along the radial inner side of the rotor bell GL. The rotor bell GL itself is made of a magnetic material, such as iron, nickel or ferrite for example. The rotor RO comprises a motor shaft not shown any further, which for example passes through the base plate GP arranged in the housing of the actuator and in ends in a toothed motor gear wheel MZ as part of a reduction gear G of the actuator. The toothed motor gear wheel MZ meshes with a toothed gear wheel ZR of the gear G.

The reduction gear G typically has yet more toothed gear wheels supported nested behind one another, in particular in the base plate GP, for the desired stepping down of a positioning element of the actuator. The positioning element can for example be a toothed segment. The positioning element itself has an actuator connection for connection of the actuator to the flap mentioned above or to the valve mentioned above as a load. Depending on the embodiment of the take-off, a predeterminable rotational movement around an adjustment axis of the actuator or a predeterminable linear adjustment movement along the adjustment axis is possible at the actuator connection.

In the present example, the reduction gear G is linked to a return spring RF, which is pre-tensioned in an actuation position of the actuator and which, if the power supply of the actuator fails or is lost, moves the positioning element back via the reduction gear G into a safe idle position of the actuator. An actuator such as this is referred to as a fail-safe actuator or also as a spring return actuator. In the example the return spring RF is a coil spring or a clockwork spring.

In some embodiments, the actuator has an electromagnet E1, E2 arranged movably on an outer side RA, AA of the rotor RO in such a way that, in a free running position, this forms an air gap LS to the outer side RA, AA of the rotor RO and in a holding position rests with contact against the outer side RA, AA of the rotor RO. RAD in this context refers to the radius of the rotor RO or of the rotor bell GL, AB refers to the (average) radial distance of the upper second electromagnet E2 indicated in FIG. 1 and $h_G$ refers to the (axial) installation height of the rotor bell GL.

In the upper left part of FIG. 1 the second electromagnet E2 is spaced via the air gap LS away from the axial outer side RA of the rotor. The second electromagnet E2 is thus located in the free running position and consequently is also not applying any holding torque with contact to the axial outer side RA of the rotor. The second electromagnet E2, by way of example, is attached via a flexible element BS, such as via a flexible bar for example, to a bracket HA fixed relative to the housing and not tensioned in a mechanical respect.

Figure 4:
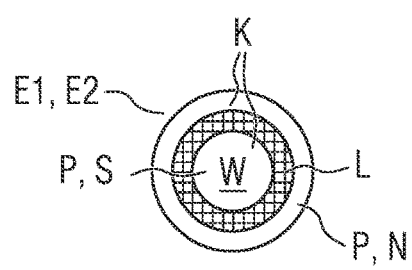
FIG. 4 shows an overhead view of the electromagnet in accordance with the direction of view IV indicated in FIG. 1.

In anticipation of FIG. 4 the electromagnets E1-E3, at their working end W opposite to the outer side of the rotor RA, AA, form one, preferably two, pole shoes P, at which during application of power to the electromagnet E1-E3, a magnetic field is formed. In the example of FIG. 1 here the electromagnets E1-E3 already also have a braking shoe B at the respective working end W for increasing the holding torque. The respective electromagnets E1-E3 comprise a coil arrangement L and a soft magnetic coil core K. For application of power the electromagnets E1-E3 are connected via a supply line Z to an electrical terminal AN of a circuit arrangement configured for this purpose for activation of the electromagnet E1-E3 as taught herein. A permanent magnet PM can also be arranged in the coil core K, as shown by the dashed lines, which creates a permanent magnetic field in the coil core K. In this case the coil core K is a soft magnetic coil core. In this case the permanent magnetic field, when the second brief current pulse is injected into the coil arrangement L and after reestablishment of the air gap LS, is no longer effective at the pole shoe P and is thus essentially compensated for.

In the upper right part of FIG. 1 the second electromagnet E2 now rests directly against the axial outer side of the rotor AA while a magnetic force F acting in the axial direction is applied and thus in the normal direction to the axial outer side of the rotor AA. $\mu_H$ refers to a dimensionless coefficient of friction, which in the present material pairing identifies material and surface properties of the axial outer side AA of the rotor RO as well as the brake shoe B resting directly against it. Thus, on the axial outer side AA of the rotor RO, in accordance with the physical relationship Friction force=normal force·coefficient of friction, the friction force $F \cdot \mu_H$, or via the average radial distance AB to the second electromagnet E2 (see FIG. 2) the holding torque $M_{FH}$, as a product of the friction force and the average radial distance AB rests against the axial outer side AA of the rotor.

Figure 2:
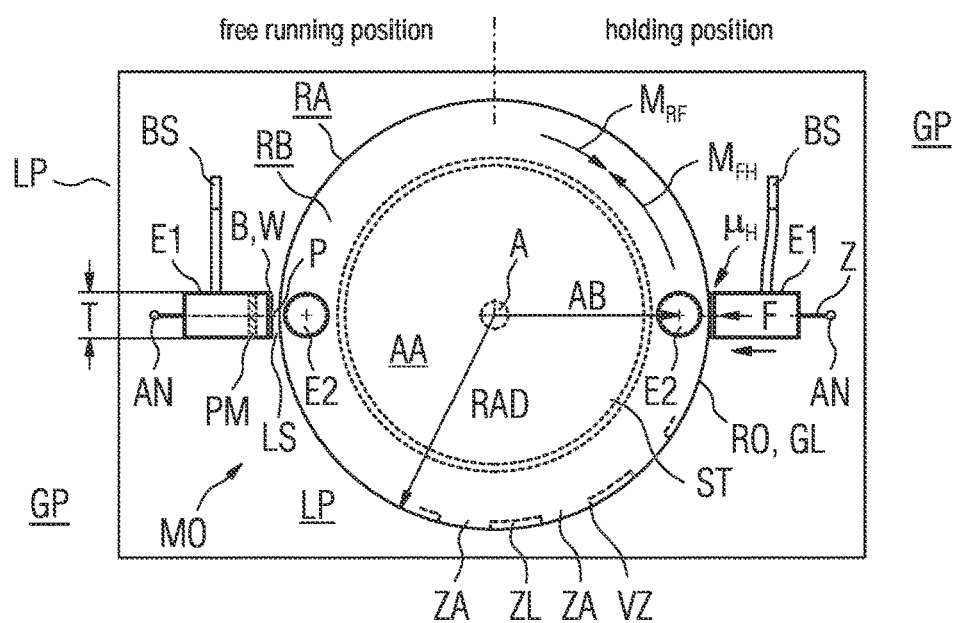
FIG. 2 shows the example in accordance with FIG. 1 in an overhead view and with toothing on the radial outer side of the rotor.

Shown in the lower part of FIG. 1, similar to the two upper electromagnets E2, is a first electromagnet E1, which is now able to be moved radially from the free running position towards the holding position towards a radial outer side RA of the rotor RO by means of magnetic force F. Shown in the left lower part of FIG. 1 is the first electromagnet E1 in the free running position. Shown in the right lower part of FIG. 2 is the first electromagnet E1 in the holding position. $H_1$ and $h_2$, by way of example, show two installation heights for the first electromagnet E1, wherein the holding torque or static friction torque $M_{FH}$ is typically all the greater the greater is the installation height $h_1$, $h_2$ of the first electromagnet E1.

In the present example, the electrical terminal for connecting the supply line Z is located on the circuit carrier LP, on which the stator ST of the electric motor MO is also arranged. In some embodiments, the electrical circuit arrangement for electrical activation of the electromagnets E1-E3 is also located on this circuit carrier LP. In addition further electrical and electronic components can be arranged on the circuit carrier LP such as the motor controller and/or a control unit (microcontroller) of the actuator and/or a power supply unit for the actuator or for the motor controller.

For a switch from the free running position into the holding position by means of the circuit arrangement, a first brief current pulse is able to be injected into the coil arrangement L, so that the electromagnet E1, E2 closes the air gap LS by means of magnetic force F towards the holding position and, through the remanent magnetic field remaining in the coil core K, stays stuck to the outer side AA of the rotor RO while a holding torque $M_{FH}$ is applied.

For a switch from the holding position into the free running position by means of the circuit arrangement, a second brief current pulse is able to be injected into the coil arrangement L, so that the remanent magnetic field present in the coil core K of the electromagnet E1, E2 is essentially compensated for and the electromagnet E1, E2, while the air gap LS is formed, moves away from the outer side RA, AA of the rotor RO towards the free running position and remains there.

Generally only a single electromagnet E1-E3 is provided per electric motor MO for applying a static friction torque $M_{FH}$ to the outer side RA, AA of the rotor RO. Two radially opposite electromagnets E1-E3 can also be provided for each electric motor MO for applying a static friction torque $M_{FH}$, of equal size, to the outer side RA, AA of the rotor RO. In the latter case no bending torque acts on the motor shaft of the electromagnet.

FIG. 2 shows the example in accordance with FIG. 1 in an overhead view. In this diagram it can easily be seen how the holding torque $M_{FH}$ applied in the right part of the figure from the first electromagnet E1 to the radial outer side RA of the rotor is greater than a motor return torque $M_{RF}$ acting from the return spring RF via the reduction gear G on the electric motor MO or on the rotor RO. Through this the electric motor MO remains in the holding position. It can also be seen how the first electromagnet E1 arranged movably by means of a flexible component BS on the circuit carrier LP is moved by magnetic force F towards the radial outer side RA of the rotor and remains there. The flexible component BS can be an L-shaped punched part made of spring steel for example.

Also shown in FIG. 2 here is toothing VZ on the radial outer side RA of the rotor RO incorporating teachings of the present disclosure. The toothing VZ running tangentially with regard to the axis of rotation A of the electric motor MO has alternating teeth ZA and tooth gaps ZL. The tooth gaps ZL have a tangential tooth gap dimension. A part P adhering to the outer side RA of the rotor RO in the holding position, such as the pole shoe P of the first electromagnet E1 here, has a maximum tangential dimension T such that, in the holding position, this part P latches or engages with one of the tooth gaps ZL of the toothing VZ. The holding torque $M_{FH}$ acting on the rotor RO is additionally increased thereby by a form fit. The radial depth of a tooth gap ZL preferably lies in the range of 0.3 mm to 1.5 mm.

Figure 3:
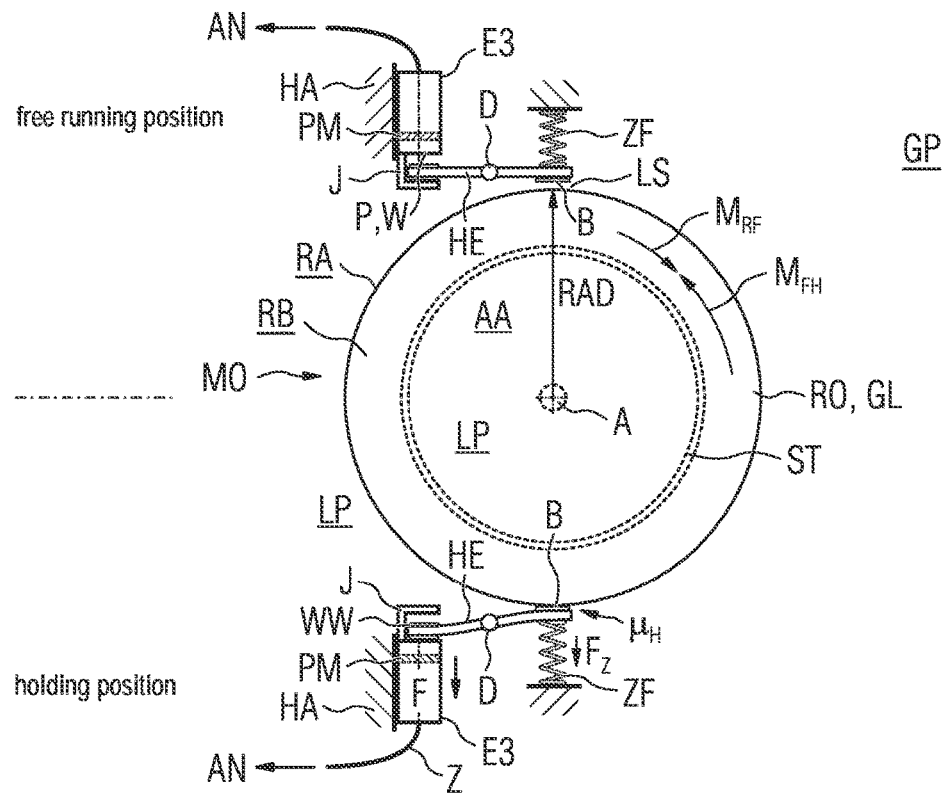
FIG. 3 shows a cross-sectional diagram through an example of an actuator with a third electromagnet for indirect application of a holding torque with contact via a remanent magnetic field incorporating teachings of the present disclosure in a free running and holding position respectively.

FIG. 3 shows a cross-sectional diagram through an example of an actuator with a third electromagnet E3 for indirect application of a holding torque $M_{FH}$ with contact via a remanent magnetic field incorporating teachings of the present disclosure in a free running and holding position respectively.

By contrast with FIG. 1 and FIG. 2, the third electromagnet E3 is arranged fixed in relation to the housing in the actuator. The holding torque $M_{FH}$ is applied here via a two-sided lever element HE, which is supported for rotation around a fixed pivot point D in the housing. In this case the lever element HE is arranged between the pole shoe P of the third electromagnet E3 and the outer side RA of the rotor RO in such a way that, in a free running position, a first and opposite second end of the lever element HE each form an air gap LS to the outer side RA of the rotor and form the pole shoe P. By contrast, in a holding position, the first and opposite second end of the lever element HE rest with contact against the outer side RA of the rotor and the pole shoe P.

In the example of FIG. 3, a spring element ZF fixed relative to the housing additionally already engages with the lever element HE in such a way that the lever element HE, in the event of the remanent magnetic field present in the coil core K of the third electromagnet E3 essentially being compensated for, moves into the free running position and is held there. In some embodiments, the third electromagnet E3 has at its working end W a pole shoe P and a magnetic yoke J lying opposite it as a further pole shoe P in such a way that the second end of the lever element HE lies between the pole shoe P and the magnetic yoke J. In this case the second end of the lever element HE, when switching from the holding position to the free running position while an air gap is formed, moves away from the pole shoe P towards the magnetic yoke J and then remains there. The second end of the lever element HE can, as shown in FIG. 3, have a magnetic and thus magnetically attractable material WW, such as a small iron plate for example. The lever element HE itself can thus be made of a non-magnetic material, such as a plastic for example.

FIG. 4 shows an overhead view of an electromagnet E1, E2 in accordance with the direction of view IV indicated in FIG. 1. In the present example, the electromagnet E1, E2 has a magnetic pot-shaped coil core K, in which a cylindrical pot (coil) L is placed. Depending on the direction of the exciter current flowing through the coil L, two opposing magnetic poles N, S are formed at both pole shoes P. In the present example a radially outer magnetic north pole N is formed at the radially outer pole shoe P and a radially inner magnetic south pole S at the inner pole shoe P.

Figure 5:
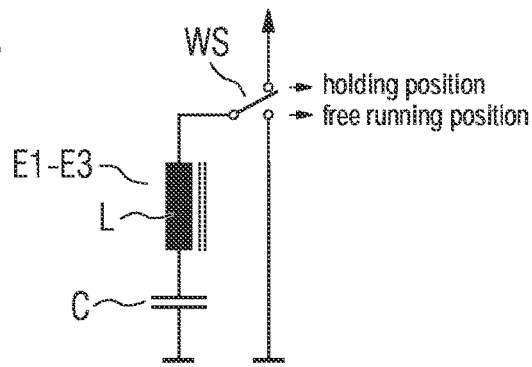
FIG. 5 shows the principle of an electrical circuit arrangement for optional activation of the electromagnet for a possible application of the holding torque by means of a first and second current pulse able to be injected into the coil arrangement of the electromagnet.

FIG. 5 shows the principle of an electrical circuit arrangement for optional activation of the electromagnet E1-E3 for a possible application of the holding torque $M_{FH}$ by means of a first and second brief current pulse able to be injected into the coil arrangement (coil) L of the electromagnet E1-E3. The circuit arrangement comprises a series circuit of the coil L of the electromagnet E1-E3 and a capacitor C as well as a changeover switch WS. The one end of the series circuit, as well as a switch contact of the changeover switch WS for the free running position, is connected to ground in each case as a common reference potential. If the changeover switch WS shown is switched into the switch position identified as the holding position, then the capacitor C is charged via supply voltage potential present via the switch contact for the holding position and via the series-connected coil L until saturation of the capacitor C. Thus a brief current pulse through the coil L is initiated, which is defined by the time constant consisting of the inductance of the coil L and the capacitance of the capacitor C. Thus an initially increasing and then decreasing current pulse flows through the coil L while a corresponding magnetic field is formed. Generally the pulse length of the current pulse lies in a region of 5 ms to 1000 ms, in particular a range of 5 ms to 200 ms, and/or in a range of 10 ms to 50 ms. If the changeover switch WS is switched from the holding position into the free running position, then the capacitor C discharges via the coil L with a reversed current direction while a corresponding magnetic field is formed with a reversed magnetic leading sign.

Figure 6:
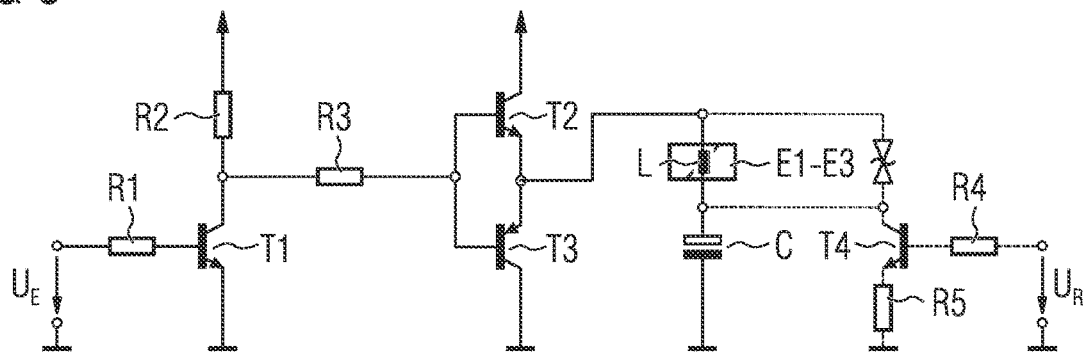
FIG. 6 shows an example of a technical realization of the electrical circuit arrangement in accordance with FIG. 5 and with a refresh function incorporating teachings of the present disclosure.

FIG. 6 shows an example of a technical realization of the electrical circuit arrangement in accordance with FIG. 5 and with a refresh function incorporating teachings of the present disclosure. If a positive switching voltage $U_E$ for setting the holding position of the electromagnet E1-E3 is present, then the push-pull stage formed from the two transistors T2, T3 switches the positive supply voltage to the series circuit consisting of the coil L of the electromagnet E1-E3 and the capacitor C. The resistance R1, the transistor T1 and also the two resistors R2, R3 function here as inverters. For as long as the switch voltage $U_E$ is present at the circuit arrangement, the capacitor C is charged until it is saturated. The electromagnet E1, E2 or the first lever element HE of the third electromagnet E3 is moved in this case by the pulse-shaped magnetic field likewise forming by magnetic force F towards the outer side RA, AA of the rotor. After charging, the circuit arrangement shown is in the stationary current saving mode. The electromagnet E1, E2 or the first lever element HE of the third electromagnet E3 then remain, on account of the remanent magnetic field, on the outer side RA, AA of the rotor and thus stick in the holding position. If the positive switching voltage $U_E$ falls towards the value 0V, then the push-pull stage switches the coil L to the common reference potential (ground). The capacitor C is discharged in the reverse way, while an opposing magnetic field is formed in the coil L. The remanent magnetic field is compensated for by this, and the electromagnet E1, E2 or the first lever element HE of the third electromagnet E3 move away from the outer side RA, AA of the rotor back into the free running position.

To be seen in the right part of FIG. 6 are a further transistor T4 and also two further resistors R4, R5, which are provided for carrying out a refresh or freshening-up function incorporating teachings of the present disclosure. If a positive switching voltage $U_R$ is present for the refresh of the electromagnet E1-E3, the capacitor C is discharged and the electromagnet E1-E3 is "freshened up" to maintain the remanent magnetic field. The freshening-up can for example take place once a day or several times a week, in order to prevent an impermissible weakening of the remanent magnetic field over time. The activation of the further transistor T4 can be undertaken for example by the circuit arrangement itself or by a higher-ranking control unit of the actuator. The activation can be undertaken by applying a once again brief voltage pulse $U_R$ in particular ranging from 5 ms to 200 ms. The component shown above the transistors T4 is an optional suppressor diode, which where necessary limits impermissibly high voltages from the coil L.

LIST OF REFERENCE CHARACTERS

A Axis of rotation, motor axis
AA Axial outer side
AB Radial distance
AN Electrical terminal
B Brake coating
BS Flexible rod, elastic component, bar
C Capacitor, electrolytic capacitor
D Axis of rotation of the lever, pivot point
E1-E3 Electromagnet, remanence magnet
F Force, magnetic force, force of attraction
$F_Z$ Tensile force
G Gear
GL Rotor bell
GP Base plate, housing part
$h_1$, $h_2$ Height of the electromagnet
HA Bracket
HE Lever element
$h_G$ Height of the rotor, height of the rotor bell
J Magnetic yoke
K Coil core
LP Circuit carrier, circuit board
L Coil arrangement, coil
LS Air gap
$M_{FH}$ Holding torque, static friction torque
MO Motor, electric motor
$M_{RF}$ Motor return torque
MZ Motor gear wheel, Motor pinion
N North pole
P Pole shoe
PM Permanent magnet
R1-R5 Ohmic resistances
RA Radial outer side of the rotor
RAD Radius of the rotor bell
RB Radial outer area of the axial outer side
RF Return spring
RO Rotor, rotor bell, rotor cup
S South pole
ST Stator
T Tangential dimension
T1-T4 Transistors, electronic switching elements
$U_E$ Switching voltage for holding mode of the electromagnet
$U_R$ Switching voltage for refresh of the electromagnet
VZ Toothing
W Working end
WS Changeover switch
WW Magnetic material
Z Supply line, connecting cable, printed conductor foil
ZA Toothing
ZF tension spring, spring element
ZL Tooth gap
ZR Toothed gear wheel
$\mu_H$ Coefficient of friction

What is claimed is:

1. An actuator for a flap or for a valve for adjusting a gaseous or fluid volume flow, the actuator comprising:
a housing;
an electric motor disposed in the housing;
a downstream reduction gear; and
a positioning element with an actuator connection for the flap or the valve;
wherein the electric motor includes a stator and a rotor circumferential to an axis of rotation of the electric motor and lying coaxially outside it;
an electromagnet arranged adjacent to an outer side of the rotor, the electromagnet including a coil arrangement with a magnetic coil core;
an electrical circuit arrangement for activation of the electromagnet, the circuit arrangement providing a first brief current pulse injected into the coil arrangement, so that subsequently a remanent magnetic field remains in the coil core, in order, in a holding position of the actuator, while a mechanical pre-tensioning is set up, to apply a holding torque with contact to the outer side of the rotor; and
the circuit arrangement provides a second brief current pulse into the coil arrangement to extinguish the remanent magnetic field still present in the coil core for releasing the holding torque with contact, forming an air gap between the electromagnet and the outer side of the rotor;
the electromagnet is arranged movably adjacent to the outer side of the rotor so the electromagnet, while the mechanical pretensioning in the holding position for applying the holding torque is formed, rests against the outer side of the rotor,
the first brief current pulse is injected into the coil arrangement so the electromagnet closes the air gap using magnetic force towards the holding position and, through the remanent magnetic field remaining in the coil core, while the holding torque to the outer side of the rotor is formed, remains magnetically adhesive;
the second brief current pulse is injected into the coil arrangement so a remanent magnetic field still present in the coil core is essentially extinguished; and
the electromagnet moves away automatically while the air gap is formed from the outer side of the rotor towards the free running position and remains there.

2. The actuator as claimed in claim 1, wherein:
the electric motor is arranged on a base plate in the housing of the actuator;
the electromagnet is arranged movably on the base plate in the housing and has a magnetic working end;
the electromagnet is aligned in such a way on the base plate that the working end of the electromagnet, in the free running position, lies against a radial outer side of the rotor while the air gap is formed.

3. The actuator as claimed in claim 2, wherein the electromagnet is arranged by means of an elastic holding element for setting up the mechanical pretensioning on the bracket of the housing or on the base plate in the housing.

4. The actuator as claimed in claim 1, wherein:
the coil core comprises a soft magnetic coil core;
a permanent magnet creates a permanent magnetic field in the coil core and is arranged in the coil core;
the permanent magnetic field, on injection of the second brief current pulse into the coil arrangement and after re-establishment of the air gap to a working end of the electromagnet, is essentially no longer effective and is thus extinguished.

5. The actuator as claimed in claim 1, wherein:
a part adhering to the outer side of the rotor in the holding position comprises a brake coating;
the brake coating has a coefficient of friction for the pairing of brake coating and outer side of the rotor of at least 0.5.

6. The actuator as claimed in claim 1, wherein:
the rotor on its outer side has toothing running around it tangentially with regard to an axis of rotation of the electric motor with alternating teeth and tooth gaps; and
the tooth gaps have a tangential tooth gap dimension and wherein a part adhering to the outer side of the rotor in the holding position, has a maximum tangential dimension, so that this latches in the holding position with one of the tooth gaps of the toothing.

7. The actuator as claimed in claim 1, further comprising:
a control unit for receiving a control signal and for corresponding activation of the electric motor for moving the positioning element from a predetermined first actuation position to a predetermined second actuation position;
wherein the control unit is configured to activate the electrical circuit arrangement for activating the electromagnet so the electromagnet, before or with the activation of the electric motor for moving the positioning element from the first actuation position to the second actuation position, switches from the holding position into the free running position; and
the control unit is configured to activate the electrical circuit arrangement in such a way that the electromagnet, as or after it reaches the second actuation position of the positioning element, switches from the free running position into the holding position.

8. The actuator as claimed in claim 1, further comprising:
a control unit for activation of the electric motor when the power supply of the actuator is switched on or when a switch-on signal to drive the positioning element from a safe idle position to an actuation position is received; and
a return spring for providing a return torque acting on the positioning element for automatically moving the positioning element into the safe idle position, wherein the return element brings about a rotor return torque at the electric motor via the reduction gear;
wherein the holding torque applied by means of the electromagnet to the rotor in the holding position is greater that the rotor return torque acting on the rotor; and
wherein the control unit is configured to activate the electrical circuit arrangement on receipt of a switch-off signal so the electromagnet switches from the holding position into the free running position, so that the positioning element is moved back automatically into the safe idle position; or
the electrical circuit arrangement is configured so, when the power supply is lost, the electromagnet switches from the holding position into free running position, so that the positioning element is moved back automatically into the safe idle position.

9. The actuator as claimed in claim 1, further comprising:
a control unit for activation of the electric motor when the power supply of the actuator is switched on or when a switch-on signal for moving the positioning element from a safe idle position to an actuation position is received;
a return spring for providing a return torque acting on the positioning element for automatically moving the positioning element into the safe idle position, in particular when the power supply for the actuator is lost;
wherein the flap connected to the actuator connection, or the valve connected to the actuator connection as well as the return spring exert an overall torque on the positioning element;
the overall torque brings about an overall rotor torque at the rotor via the reduction gear;
the holding torque applied by means of the electromagnet to the rotor of the electric motor in the holding position is greater than the overall rotor torque acting on the rotor; and
the control unit is configured to activate the electrical circuit arrangement on receipt of a switch-off signal in such a way that the electromagnet switches from the holding position into the free running position, so that the positioning element is moved back automatically into the safe idle position, or
the electrical circuit arrangement is configured in such a way that the electromagnet switches from the holding position into the free running position when the power supply is lost, so that the positioning element is moved back automatically into the safe idle position.

10. The actuator as claimed in claim 1, wherein:
the coil arrangement of the electrical circuit arrangement has an electrical coil;
the electrical coil is connected in series with a capacitor;
the series circuit is connected by a first end to a common reverence potential;
a second end is able to be switched via a switching means of the electrical circuit arrangement to a supply voltage or to the common reference potential;
the inductance value of the electrical coil and the capacitance value of the capacitor are dimensioned in such a way that, when the second end of the series circuit is switched to the supply voltage, the first brief current pulse is able to be injected into the electrical coil and, when the second end of the series circuit is switched to the common reference potential, the second brief current pulse is able to be injected into the electrical coil with the reversed current direction.

11. An actuator for a flap or for a valve for adjusting a gaseous or fluid volume flow, the actuator comprising:
a housing;
an electric motor disposed in the housing;
a downstream reduction gear; and
a positioning element with an actuator connection for the flap or the valve;
wherein the electric motor includes a stator and a rotor circumferential to an axis of rotation of the electric motor and lying coaxially outside it;
an electromagnet arranged adjacent to an outer side of the rotor, the electromagnet including a coil arrangement with a magnetic coil core;
an electrical circuit arrangement for activation of the electromagnet, the circuit arrangement providing a first brief current pulse injected into the coil arrangement, so that subsequently a remanent magnetic field remains in the coil core, in order, in a holding position of the actuator, while a mechanical pre-tensioning is set up, to apply a holding torque with contact to the outer side of the rotor; and
the circuit arrangement provides a second brief current pulse into the coil arrangement to extinguish the remanent magnetic field still present in the coil core for releasing the holding torque with contact, forming an air gap between the electromagnet and the outer side of the rotor
the electromagnet is arranged fixed in relation to the housing;
a rotatably supported two-sided lever element is arranged between a magnetic working end of the electromagnet and the outer side of the rotor in such a way that a first and opposite second end of the lever element respectively form an air gap to the outer side of the rotor and to the working end in a free running position, and that the first and opposite second end of the lever element rest with contact against the outer side of the rotor and the working end in a holding position;
the first brief current pulse is injected in such a way into the coil arrangement that the electromagnet closes both air gaps by means of magnetic force towards the holding position;
the second end of the lever element remains stuck through the remanent magnetic field remaining in the coil core to the working end of the electromagnet;
the first end of the lever element rests, while the holding torque is applied, against the outer side of the rotor;
the second brief current pulse is able to be injected into the coil arrangement in such a way that the remanent magnetic field present in the coil core of the electromagnet is essentially extinguished; and
the first and second end of the lever element, while the respective air gap is formed, move away from the outer side of the rotor and away from the working end of the electromagnet into the free running position.

12. The actuator as claimed in claim 11, wherein:
the electric motor and the electromagnet are arranged fixed to a base plate in the housing of the actuator; and
the lever element is arranged for rotation around an axis of rotation of the lever running in parallel to the axis of rotation of the electric motor, so that the first end of the lever element, opposite to the working end of the electromagnet is able to be laid tangentially on the radial outer side of the rotor in the holding position.

13. The actuator as claimed in claim 11, wherein a spring element fixed in relation to the housing engages in such a way on the lever element that the lever element, in the event of the remanent magnetic field present in the coil core of the electromagnet essentially being extinguished, is moved automatically into the free running position and is held there.

14. The actuator as claimed in claim 11, wherein:
the actuator, instead of a two-sided lever element, has a single-sided swivel lever element, wherein a first end of the end of the swivel lever element is supported at a pivot point fixed in the housing, wherein an opposite second end of the swivel lever element, in the free running position while an air gap is formed, lies opposite the working end of the electromagnet or, in the holding position while the air gap is closed, rests directly against the working end; and
in the free running position, a middle part embodied between the first and second end of the swivel lever element, while an air gap is formed, lies opposite the outer side of the rotor of the electric motor or in the holding position, while closing the air gap, rests directly against the outer side of the rotor.

15. The actuator as claimed in claim 11, wherein:
the coil core comprises a soft magnetic coil core;
a permanent magnet creates a permanent magnetic field in the coil core and is arranged in the coil core;
the permanent magnetic field, on injection of the second brief current pulse into the coil arrangement and after re-establishment of the air gap to a working end of the electromagnet, is essentially no longer effective and is thus extinguished.

16. The actuator as claimed in claim 11, wherein:
a part adhering to the outer side of the rotor in the holding position comprises a brake coating;
the brake coating has a coefficient of friction for the pairing of brake coating and outer side of the rotor of at least 0.5.

17. The actuator as claimed in claim 11, wherein:
the rotor on its outer side has toothing running around it tangentially with regard to an axis of rotation of the electric motor with alternating teeth and tooth gaps; and
the tooth gaps have a tangential tooth gap dimension and wherein a part adhering to the outer side of the rotor in the holding position, has a maximum tangential dimension, so that this latches in the holding position with one of the tooth gaps of the toothing.

18. The actuator as claimed in claim 11, further comprising:
a control unit for receiving a control signal and for corresponding activation of the electric motor for moving the positioning element from a predetermined first actuation position to a predetermined second actuation position;
wherein the control unit is configured to activate the electrical circuit arrangement for activating the electromagnet so the electromagnet, before or with the activation of the electric motor for moving the positioning element from the first actuation position to the second actuation position, switches from the holding position into the free running position; and
the control unit is configured to activate the electrical circuit arrangement in such a way that the electromagnet, as or after it reaches the second actuation position of the positioning element, switches from the free running position into the holding position.

19. The actuator as claimed in claim 11, further comprising:
a control unit for activation of the electric motor when the power supply of the actuator is switched on or when a switch-on signal to drive the positioning element from a safe idle position to an actuation position is received; and a return spring for providing a return torque acting on the positioning element for automatically moving the positioning element into the safe idle position, wherein the return element brings about a rotor return torque at the electric motor via the reduction gear;

wherein the holding torque applied by means of the electromagnet to the rotor in the holding position is greater that the rotor return torque acting on the rotor; and wherein the control unit is configured to activate the electrical circuit arrangement on receipt of a switch-off signal so the electromagnet switches from the holding position into the free running position, so that the positioning element is moved back automatically into the safe idle position; or the electrical circuit arrangement is configured so, when the power supply is lost, the electromagnet switches from the holding position into free running position, so that the positioning element is moved back automatically into the safe idle position.

20. The actuator as claimed in claim 11, further comprising:

a control unit for activation of the electric motor when the power supply of the actuator is switched on or when a switch-on signal for moving the positioning element from a safe idle position to an actuation position is received;

a return spring for providing a return torque acting on the positioning element for automatically moving the positioning element into the safe idle position, in particular when the power supply for the actuator is lost;

wherein the flap connected to the actuator connection, or the valve connected to the actuator connection as well as the return spring exert an overall torque on the positioning element;

the overall torque brings about an overall rotor torque at the rotor via the reduction gear;

the holding torque applied by means of the electromagnet to the rotor of the electric motor in the holding position is greater than the overall rotor torque acting on the rotor; and the control unit is configured to activate the electrical circuit arrangement on receipt of a switch-off signal in such a way that the electromagnet switches from the holding position into the free running position, so that the positioning element is moved back automatically into the safe idle position, or the electrical circuit arrangement is configured in such a way that the electromagnet switches from the holding position into the free running position when the power supply is lost, so that the positioning element is moved back automatically into the safe idle position.

21. The actuator as claimed in claim 11, wherein:

the coil arrangement of the electrical circuit arrangement has an electrical coil;

the electrical coil is connected in series with a capacitor;

the series circuit is connected by a first end to a common reverence potential;

a second end is able to be switched via a switching means of the electrical circuit arrangement to a supply voltage or to the common reference potential;

the inductance value of the electrical coil and the capacitance value of the capacitor are dimensioned in such a way that, when the second end of the series circuit is switched to the supply voltage, the first brief current pulse is able to be injected into the electrical coil and, when the second end of the series circuit is switched to the common reference potential, the second brief current pulse is able to be injected into the electrical coil with the reversed current direction.

* * * * *